United States Patent [19]

Kedmi et al.

[11] Patent Number: 5,073,007
[45] Date of Patent: Dec. 17, 1991

[54] DIFFRACTIVE OPTICAL ELEMENT

[75] Inventors: Joseph Kedmi; Israel Grossinger, both of Rehovot, Israel

[73] Assignee: Holo-Or Ltd., Rehovot, Israel

[21] Appl. No.: 536,177

[22] Filed: Jun. 11, 1990

[51] Int. Cl.[5] .......................... G02B 27/44; G02B 3/08
[52] U.S. Cl. ..................................... 359/565; 359/571; 359/742; 359/900
[58] Field of Search .............. 350/162.16, 452, 162.22, 350/162.17, 162.2, 320

[56] References Cited

U.S. PATENT DOCUMENTS

| | | | |
|---|---|---|---|
| 3,547,546 | 12/1970 | Schier | 350/162.16 |
| 4,637,697 | 1/1987 | Freeman | 350/162.16 |
| 4,846,552 | 2/1988 | Veldkamp et al. | |
| 4,895,790 | 1/1990 | Swanson et al. | 430/321 |

FOREIGN PATENT DOCUMENTS

1-142604  6/1989  Japan ............................. 350/162.16

OTHER PUBLICATIONS

Kirk et al., "Phase-Only Complex-Valued Spatial Filter", *Journal of the Optical Society of America*, vol. 61, No. 8, Aug. 1971, pp. 1023 to 1028.
Chu et al, "Multiemulsion On-Axis Computer-Generated Hologram", *Applied Optics*, vol. 12, No. 7, Jul. 1973, pp. 1386 to 1388.
Chu et al, "Recent Approaches to Computer-Generated Holograms", *Optical Engineering*, vol. 13, No. 3, May/Jun. 1974, pp. 189 to 195.
D'Auria et al, "Photolithographic Fabrication of Thin Film Lenses", *Optical Communications*, vol. 5, No. 4, Jul. 1972, pp. 232-235.
Rogers, "The Manufacture of a Stepped Zone-Plate", *J. Sci. Instrum.*, vol. 43, May 1966, pp. 328-329.
Blazed Synthetic Phase-Only Holograms, H. Dammann, Sep. 1969, pp. 95-104.
Micro Fresnel Lenses, H. Nishihara and T. Suhara, 1987, pp. 3-36.
Optical Engineering, Diffractive Optical Elements for Use in Infrared Systems, Jun. 1989, vol. 28, No. 6.
Infrared Applications of . . . Elements, SPIE vol. 883, Holographic Optics, Design & Appln. (1988), pp. 155-162.
Developments in Fabrication . . . Elements, SPIE vol. 437, Int'l. Conference on Computer-Generated Holography, 1983, pp. 54-59.
The Kinoform: A New Wavefront Reconstruction Device, IBM J. Res. Develop., 1969, pp. 150-155.
Wai-Hon Lee, Computer Generated Holograms, Techniques and Applications Progress in Optics XVI, 1978.

*Primary Examiner*—Bruce Y. Arnold
*Assistant Examiner*—Martin Lerner
*Attorney, Agent, or Firm*—Limbach, Limbach & Sutton

[57] ABSTRACT

There is disclosed a diffractive optical element and a method to produce same wherein the element comprises a base and at least one phase zone comprising an arbitrary multiplicity M of steps of generally identical step height, wherein M is not a power of 2. The method includes the steps of defining a basic depth unit equivalent to a zone height divided by M, defining a depth sequence of N depths wherein N is the smallest integer greater than $\log_2 M$ such that each of the M steps can be produced by at least one linear combination of the N depths, defining N masks herein each mask enables the optical element to be processed to one of the N depths and wherein for each mask, the steps to be processed are those which have the one of the N depths in its linear combination and serially utilizing each of the N masks for processing of the optical element.

14 Claims, 5 Drawing Sheets

| STEP | SEQ. 1 | SEQ. 2 |
|------|--------|--------|
| 100 | 0t | 0t |
| 101 | 1t | 1t |
| 102 | 2t | 2t |
| 103 | (1+2)t | 3t |
| 104 | 4t | (1+3)t |
| 105 | (1+4)t | (2+3)t |
| 106 | (2+4)t | (1+2+3)t |
| 107 | (1+2+4)t | (1+3+3)t |
| 108 | (2+4+2)t | (2+3+3)t |
| 109 | (1+2+4+2)t | (1+2+3+3)t |

FIG. 3A

SEQ. 1

| MASK | DEPTH | STEPS |
|------|-------|-------|
| 1 | 4t | 104,105,106,107,108,109, |
| 2 | 2t | 102,103,106,107,108,109 |
| 3 | 2t | 108,109 |
| 4 | 1t | 101,103,105,107,109 |

SEQ. 2

| MASK | DEPTH | STEPS |
|------|-------|-------|
| 1 | 3t | 103,104,105,106,107,108,109 |
| 2 | 3t | 107,108,109 |
| 3 | 2t | 102,105,106,108,109 |
| 4 | 1t | 101,104,106,107,109 |

DIFFRACTIVE OPTICAL ELEMENT

FIELD OF THE INVENTION

The present invention relates to diffraction optical elements generally.

BACKGROUND OF THE INVENTION

It is known in the art to produce diffractive optical elements which manipulate incident light beams, an example light beam manipulation being the conversion of planar or spherical wavefronts to generalized wavefronts. The diffractive optical elements are generally thinner, lighter, can be corrected for many types of aberrations and distortions and can combine several functions into one element. They are generally more versatile than standard optical elements and are, therefore, desirable for use laser beam handling systems such as laser scanners, compact discs, laser computerized processing, laser radars and bar code scanners.

The article, "Micro Fresnel Lenses" by H. Nishihara and T. Suhara in *Progress in Optics XXIV*, edited by E. Wolf, presents background information on diffraction lenses of the Fresnel type.

Computed generated diffractive optical elements are attractive since they may be designed to perform very complex operations on the phase of the incident light beams.

A computer generated diffractive optical element with high efficiency is the Kinoform, described in the article "The Kinoform: A New Wavefront Reconstruction Device," by L. B. Lesem, P. M. Hirsch, and J. A. Jordan published in *The IBM Journal of Research and Development*, Vol. 13, pp. 150-155, 1960. However, since the Kinoform has a continuous phase profile which must be accurately produced, it is difficult to manufacture.

As is discussed in the article "Blazed Synthetic Phase-Only Holograms," by H. Dammann, published in *Optik* 31, 1970, pp. 95-104, it is possible to approximate a continuous phase profile with a stepwise profile of discrete phase levels. Dammann shows that this approximation produces several diffraction orders where the phase of the first order matches exactly the phase of the continuous profile and its efficiency approaches 100% as more steps are added. For example, 10 steps produce a diffraction efficiency of the first order of almost 97%.

Etching or thin film coating techniques enable the production of the necessary multilevel profile. This is discussed in the following articles by Swanson and Veldkamp:

"Diffractive Optical Elements for Use in Infrared Systems," *Optical Engineering*, June 1989, Vol. 28 No. 6, pp. 605-608; and "Infrared Applications of Diffractive Optical Elements,", *SPIE Vol.* 883: *Holographic Optics: Design and Applications* (1988), pp. 155-162, wherein the diffractive optical elements produced by their method have $2^N$ steps produced via the use of N masks in N serial manufacturing cycles. The etching depths of each of the N steps are related by a fixed ratio and at each manufacturing cycle, each step is divided into two steps such that the number of steps is doubled.

As is known in the art, the width of each step becomes narrower as the number of steps increases and the minimum line width is typically determined by manufacturing constraints such as thinnest etching or deposition width. The method of Swanson and Veldkamp, restricts the number of steps that are produced to be a power of 2. Thus, if, for example, eight steps do not satisfy the efficiency requirements, sixteen steps must be produced. If manufacturing constraints do not permit sixteen steps to be produced, then only eight steps can be produced resulting in an optical element of lower efficiency than desired. If, however, manufacturing constraints do permit a number of steps between eight and sixteen, the abovementioned method does not provide a way to produce it.

SUMMARY OF THE INVENTION

It is therefore an object of the present invention to manufacture a diffractive optical element with the highest possible efficiency whose number of steps is arbitrarily chosen and is typically determined by manufacturing limitations.

There is therefore provided, in accordance with a preferred embodiment of the present invention, a diffractive optical element comprising a base and at least one phase zone comprising an arbitrary multiplicity of steps of generally identical step height t, wherein the multiplicity is not a power of 2.

Additionally, in accordance with a preferred embodiment of the present invention, the at least one phase zone has a predetermined zone height and the generally identical step height t is equal to the zone height divided by the multiplicity of steps.

Moreover, in accordance with an alternative embodiment of the present invention, the at least one phase zone includes at least one wide phase zone and at least one narrow phase zone and the arbitrary multiplicity of steps is a different multiplicity of steps for the wide phase zone and for the narrow phase zone.

There is also provided, in accordance with a preferred embodiment of the present invention, a method of producing a diffractive optical element with at least one phase zone having a zone height and comprising an arbitrary multiplicity M of steps, wherein M is not a power of 2. The method comprises the stages of defining a basic depth unit equivalent to the zone height divided by M, defining a depth sequence of N depths wherein N is the smallest integer greater than $\log_2 M$ such that each of the M steps can be produced by at least one linear combination of the N depths, defining N masks wherein each mask enables the optical element to be processed to one of the N depths and wherein for each mask, the steps to be processed are those which have the one of the N depths in its linear combination and serially utilizing each of the N masks for processing of the optical element.

Additionally, in accordance with a preferred embodiment of the present invention, the stage of serially utilizing includes the stage of serially etching the optical element to each of the N depths. Alternatively, the stage of serially utilizing includes the stage of serially depositing onto the optical element amounts of material whose heights are equivalent to each of the N depths.

Moreover, in accordance with a preferred embodiment of the present invention, the stage of defining a depth sequence includes the step of defining a new depth sequence from an old depth sequence. The new depth sequence typically comprises one more depth than the old depth sequence.

Finally, there is provided, in accordance with an alternative embodiment of the present invention, a method of producing a diffractive optical element with at least one wide and one narrow phase zone each having a zone height, wherein the at least one wide phase zone comprises an arbitrary multiplicity M of steps and wherein M is not a power of 2, including the stages of defining a basic depth unit equivalent to the zone height divided by M, defining a depth sequence of N depths wherein N is the smallest integer greater than $\log_2 M$ such that each of the M steps can be produced by at least one linear combination of the N depths, defining N masks wherein each mask enables the optical element to be processed to one of the N depths, wherein for each mask, the steps to be processed are those which have the one of the N depths in its linear combination and wherein portions of each mask corresponding to portions of the at least one narrow phase zone can be masked out and serially utilizing each of the N masks for processing of the optical element.

BRIEF DESCRIPTION OF THE DRAWINGS

The present invention will be understood and appreciated more fully from the following detailed description taken in conjunction with the drawings in which.

DETAILED DESCRIPTION OF PRESENT INVENTION

Figure 1A:
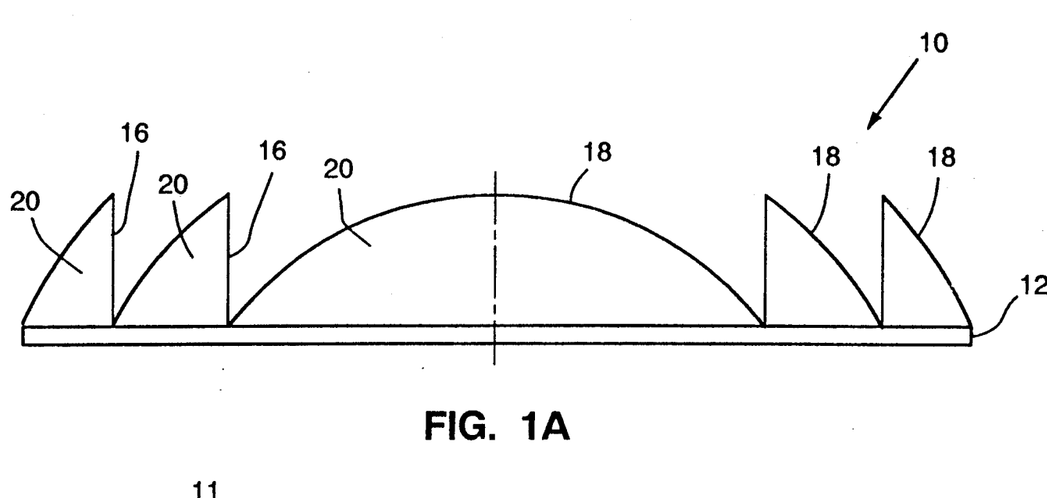
FIG. 1A is a cross-sectional illustration of a diffractive optical element of the Fresnel type.
Figure 1B:
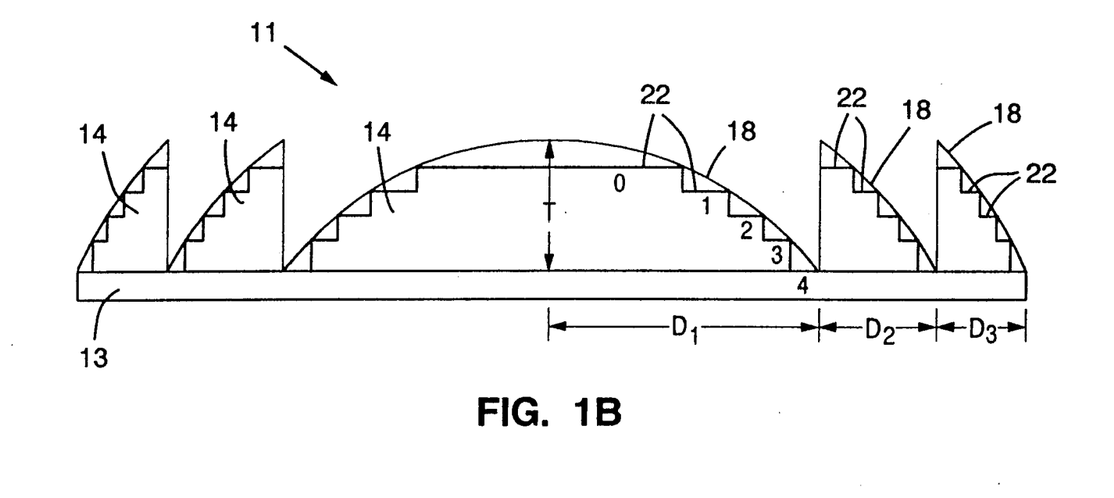
FIG. 1B is a cross-sectional illustration of a diffractive optical element with an arbitrary multiplicity of steps per phase zone constructed and operative in accordance with a preferred embodiment of the present invention.

Reference is now made to FIGS. 1A and 1B which respectively illustrate an ideal diffractive optical element 10 and an optical element 11 constructed and operative in accordance with a preferred embodiment of the present invention.

Ideal diffractive optical element 10 comprises a base 12 integrally formed with a multiplicity of phase retardation zones 20 forming the continuous phase profile of the phase retardation function of a given wavefront of an incoming beam of light. As is known in the art, the shape of the phase zones 20 is a straight edge 16 on one side and a smooth curve 18 on the other.

In accordance with a preferred embodiment of the present invention, optical element 11 comprises a multiplicity of phase zones 14 integrally formed on base 13 wherein the ideal shape of each curve 18 is approximated by an arbitrary number of steps 22 of equivalent height. The number of the steps 22 is generally dictated by the minimum resolution of a fabrication process, described in more detail hereinbelow, by which the steps are produced.

Figure 2:
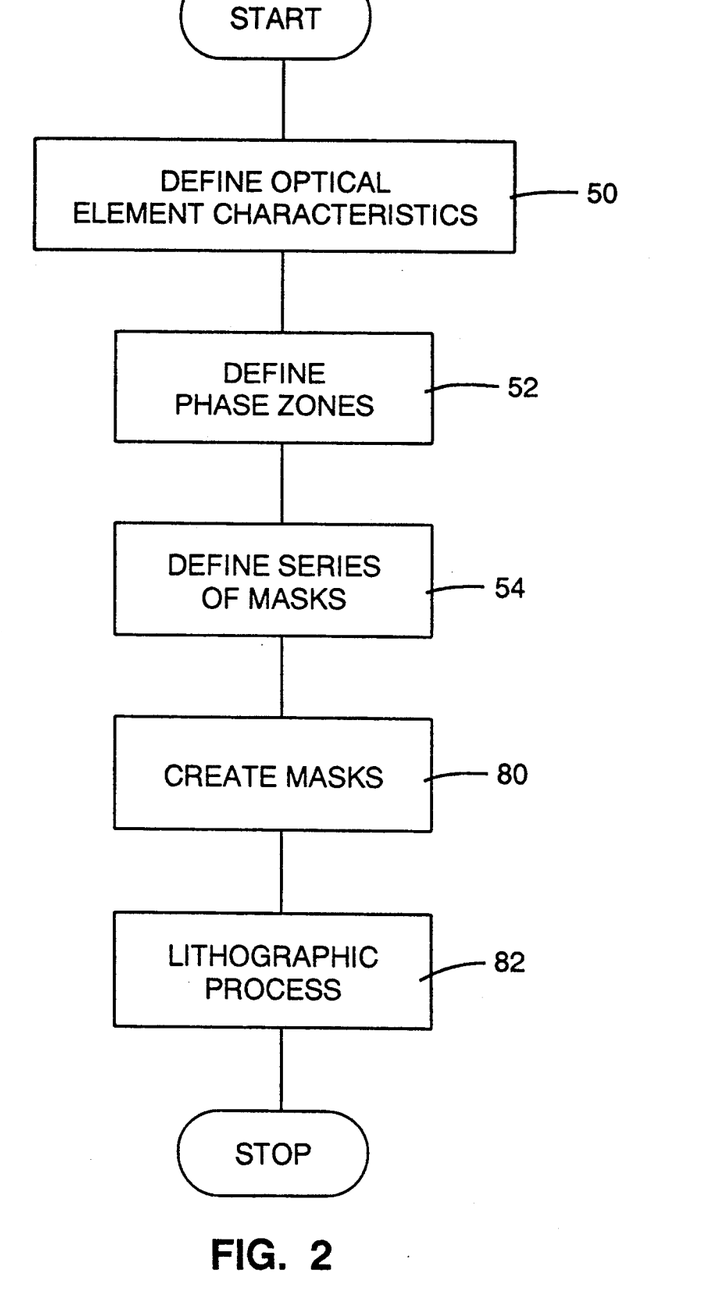
FIG. 2 is a flow chart illustration outlining a method of fabricating the diffractive optical element of FIG. 1B.

Reference is now made to FIG. 2 which illustrates a method for fabricating at least one optical element 11. In step 50 the optical element is defined by defining the characteristics of both the incoming light beams and the desired outgoing light beams. This defines the optical properties of the optical element to be manufactured.

For example, a spherical phase profile for a collimating lens is:

$$\phi(x,y) = (2\pi/\lambda) \cdot \sqrt{x^2 + y^2 + F^2} \quad (1)$$

where lambda is the wavelength of the incoming light beam and F is the desired focal length of the lens.

A second example is that of a quadratic phase profile:

$$\phi(x,y) = 2\pi/\lambda ((x^2 + y^2)/2F) \quad (2)$$

A third example is a more general aspheric phase profile:

$$\phi(r) = 2\pi/\lambda (\sum(a_i r^i)) \quad (3)$$

where r is the radius from the center of the optical element and is equivalent to $\sqrt{x^2+y^2}$, the $a_i$ are coefficients which are defined by the designed use of the optical element and i varies between 1 and the required number of coefficients $a_i$.

In step 52 the phase zones are defined by evaluating the phase profile $\phi(x,y)$ modulo $2\pi$. This produces the locations on the optical element of the straight edges 16 thereby producing varying widths $D_i$ (FIG. 1B) of the phase zones 14. I is the number of phase zones 14 on the optical element and i varies between 1 and I. In addition, a zone height T of the phase zones 14 is defined as follows:

$$T = \lambda/\Delta n \quad (4)$$

where $\Delta n$ is the difference between the indices of refraction of the medium in which the elements are embedded and the material of the optical element, such as glass, gallium arsenide, zinc selenide, germanium or quartz, out of which the optical element 11 will be made.

The phase zones are produced via VLSI etching or deposition techniques, as described hereinbelow. The essential equipment necessary for producing the phase zones include, for example, an electron or laser beam pattern generator for generating a series of masks to be placed successively on the optical element 11, a spin coater to spread photoresist on the optical element 11, a mask aligner and U. V. exposure system for aligning successive masks with high accuracy and for exposing the photoresist, and either a reactive ion etcher to etch the optical element 11 to a predefined depth or an evaporator for depositing onto the base 13 a predefined amount of material for building up at least one step wherever a given mask does not cover the optical element 11.

In step 54 a series of binary masks are defined which produce an arbitrary number M of steps of equivalent step height across the entirety of optical element 11. The number of masks necessary to produce such an optical element 11 is N where N is defined as the smallest integer which is greater than $\log_2 M$.

For example, for $M = 10$, or 10 steps 22, the number of masks is $N = 4$. In accordance with the present invention, four masks can produce any number of levels between nine and sixteen where each of the N masks is utilized in only one etching or deposition cycle.

The mask definition algorithm for defining the N masks is described hereinbelow. As shown in FIG. 1B, for an M-level profile, the M steps are numbered $0 - (M-1)$. A depth difference t between consecutive steps, called a basic depth unit, is defined according to the following equation:

$$t = T/M \qquad (5)$$

and the depth of a kth step is kt. The step height of each step is t.

The algorithm defines a sequence of N depths, each an integer multiple of the basic depth unit t, such that each step depth between 0t and $(M-1)t$ can be produced as a linear combination of the N defined depths.

For example, to construct an optical element 11 with $M = 5$ steps 22, as shown in FIG. 1B, the number N of masks needed is three. The mask definition algorithm defines a sequence of three depts (1t, 2t, 3t) such that the depts $0 - 4t$ are produced as 0, 1t, 2t, 3t and $3t + 1t$.

The optical element 11 with five steps 22 can then be constructed as follows: a first etching or deposition to a depth of 3t to produce third step 22 and part of the fourth step 22, a second etching or deposition cycle to a depth of 2t to produce the second step 22, and a third etching or depositon cycle to a depth of it to produce the first step 22 and to finish the production of the fourth step 22. It will be noted that the 0th step, which is the highest step in an etching process and the lowest step in a deposition process, is never processed.

Accordingly, the first mask is defined, as described hereinabove, to enable processing of the third and fourth steps 22 of each phase zone to a depth of 3t, the second mask enables processing of the second step 22 of each phase zone to a depth of 2t and the third mask enables processing of the first and fourth step 22 of each phase zone to a depth of 1t.

It will be appreciated that many sequences of N depths can be generated for a given desired number of steps. A sequence can be generated by taking the first S elements in the sequence of powers of 2, where S is the integer value of $\log_2 M$, and multiplying each element by the basic depth unit t. The final depth is the difference between the sum of the S depths and the value $(M-1)t$. For a ten step optical element $(M = 10)$, this method produces a sequence of (1t, 2, 4t, 2t).

An alternative method for producing a sequence seeks to reduce the largest depth, if possible. The method comprises the following algorithm where N is the integer part of $\log_2 M$.

If $(M - 2^N) >= 2^{N-1}$ then (6)
$l = M - 2^N$
the sequence is: $t, 2t, \ldots, 2^{N-1}t, lt$
else
if $(M - 2^{N-1})/$ is even then (7a)
$l = (M - 2^{N-1})/2$
the sequence is: $t, 2t, \ldots, 2^{(N-2)}t, lt, lt$
else
$l = \text{int}((M - 2^{N-1})/2$ (7b)
the sequence is: $t, 2t, \ldots, 2^{(N-2)}t, lt, (l+1)t$ A further method for producing a sequence is as follows. If an original sequence of N depths has already been defined for an optical element 11 of M steps, the defined sequence can be utilized to define a new sequence of $N+1$ depths for producing an optical element 11 of Q steps, where Q is less than 2M.

For the new sequence of $N+1$ depths, the basic depth unit t is defined as:

$$t = T/Q \qquad (8)$$

and the additional depth is Lt, where L equals $Q - M$. The first M steps, from 0to $M-1$, are produced by the original sequence of N depths, and the L steps from M to $M + L - 1$ are processed in the same cycles as the L steps from $M - L$ to $M - 1$ with the addition of the depth Lt.

In this manner, if a sequence for producing M steps already exists, a new sequence for producing up to 2M steps can easily be defined. It will be noted that M is the maximum value that L can have. If L is taken to be larger than M, at least one step, the step where $k = M$, cannot be produced.

For example, a ten step optical element 11 can be produced by taking the sequence of (1t, 2t, 3t) which produces an element 11 of seven steps, and adding to it a depth of 3t.

The two sequences, described hereinabove, for producing a ten step optical element 11, where (1t, 2t, 4t, 2t) is defined as Seq. 1, and (1t, 2t, 3t, 3t) is defined as Seq. 2, are both equally useful for producing a ten step optical element 11. An operator would choose between them based on manufacturing parameters such as manufacturing convenience, maximum depth, etc.

Figure 3A:
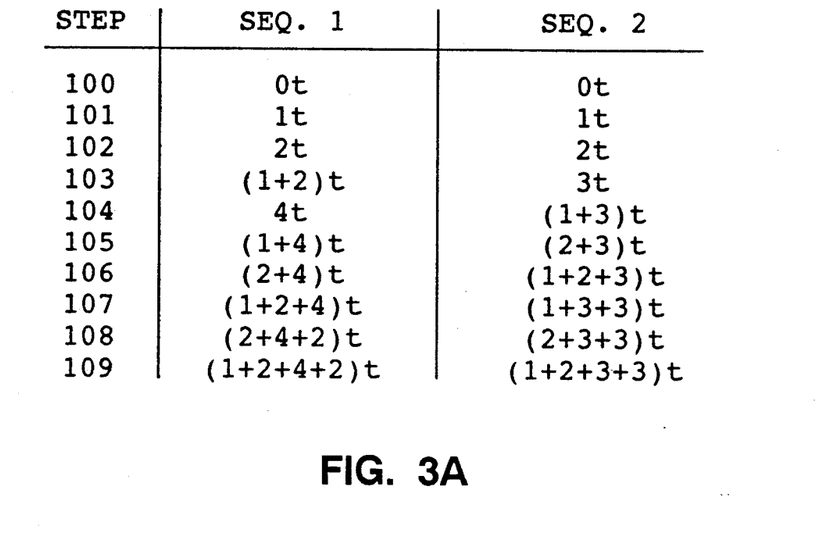
FIG. 3A is a tabular illustration indicating depth combinations for two sequences of etch depths useful for producing an optical element of FIG. 1B with ten steps.
Figure 3B:
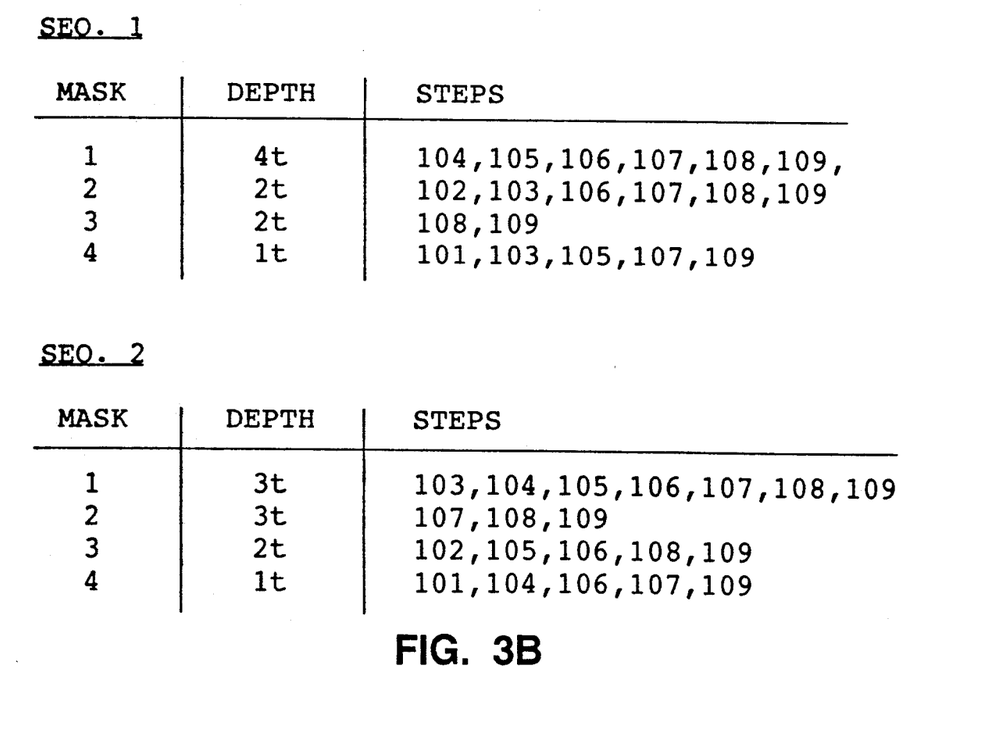
FIG. 3B is a tabular illustration indicating the steps to be etched by each mask in the two sequences of FIG. 3A.
Figure 4A:
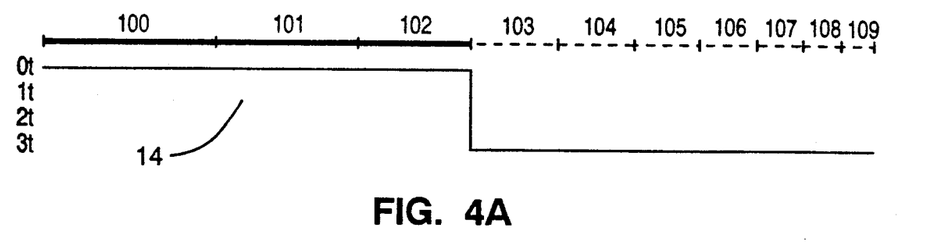
FIGS. 4A–4D are schematic illustrations of the results of etching a single phase zone with four masks corresponding to the second sequence of FIG. 3A.
Figure 4B:
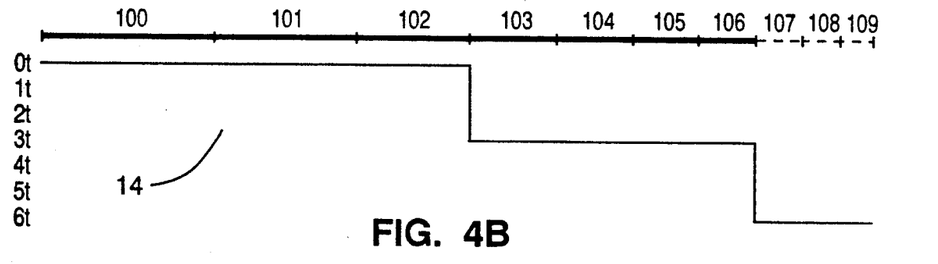
Figure 4C:
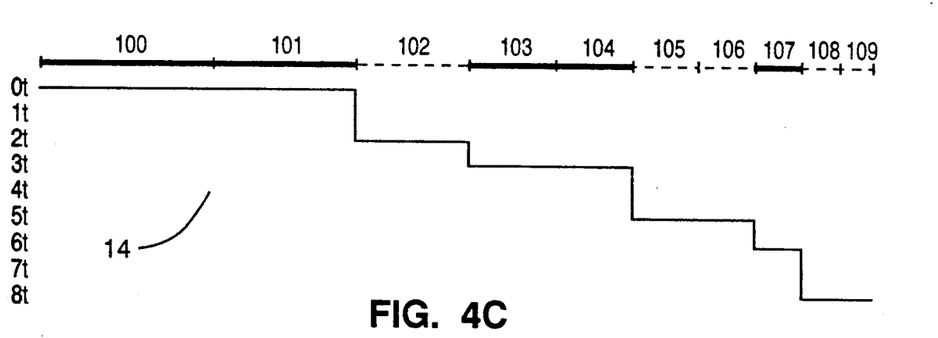
Figure 4D:
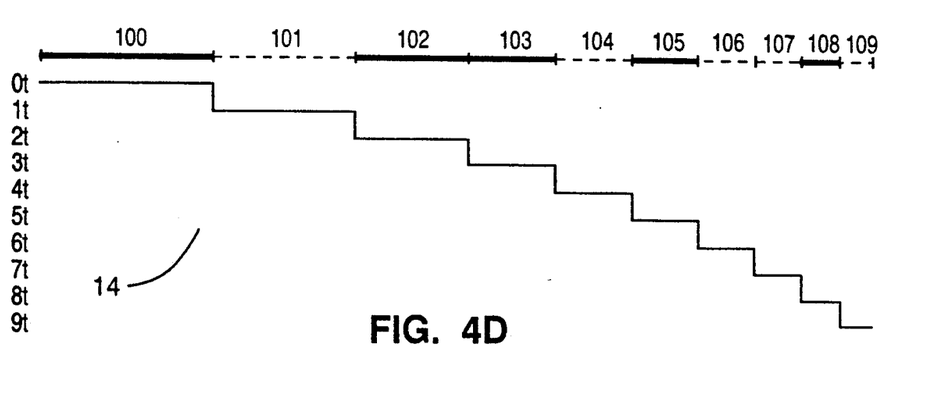

Reference is now made to FIGS. 3A and 3B which respectively tabulate the depth combinations for each step, where the steps are numbered 100-109, in both of the above sequences and the resultant steps 100-109 processed by each mask.

As shown in FIG. 3A, for Seq. 1, steps 108 and 109 have the same depth combinations as for steps 106 and 107 with the addition of the new depth 2t. For Seq. 2, steps 107, 108 and 109 have the same depth combinations as for steps 104, 105 and 106 with the addition of the new depth 3t.

The four masks are defined by combining together those steps which have a given depth in their linear combination. Thus, the first mask enables those steps to be produced which have a first depth, the second mask enables production of those steps which have a second depth, etc. It will be noted that many steps are produced through the operation of more than one mask.

As can be seen from FIG. 3B, the four masks of the two sequences produce different combinations of steps. However, the optical element 11 resulting from the two sequences is identical. In general, for any number of steps 22, there are several sequences of depths that will produce the same final result. Moreover, the order of the depths does not affect the final result.

The depths are not necessarily related by a fixed ratio. For example, the sequence of (1t, 2t, 3t, 3t) has no common ratio among the depths.

Reference is now made to FIGS. 4A–4D which illustrate the production, by etching, of one phase zone 14 with ten-steps according to Seq. 2 of FIGS. 3A and 3B. For each of FIGS. 4A–4D, the mask used in the production stage shown in the Figure is shown above the phase zone 14 to be produced with step numbers marked along it. Depth levels are marked on the left hand side of the Figure.

As tabulated in FIG. 3B the first mask is utilized to etch the steps 103-109 to a depth of 3t. The second mask is utilized to further etch the steps 107-109 another 3t to a depth of 6t. The third mask further etches steps 102, 105, 106, 108 and 109 a depth of 2t to produce a maximum depth of 8t. Finally, the fourth mask etches steps 101, 104, 106, 107, and 109 a depth of 1t to produce a final maximum depth of 9t and a phase zone of ten equal height steps.

Figure 5A:
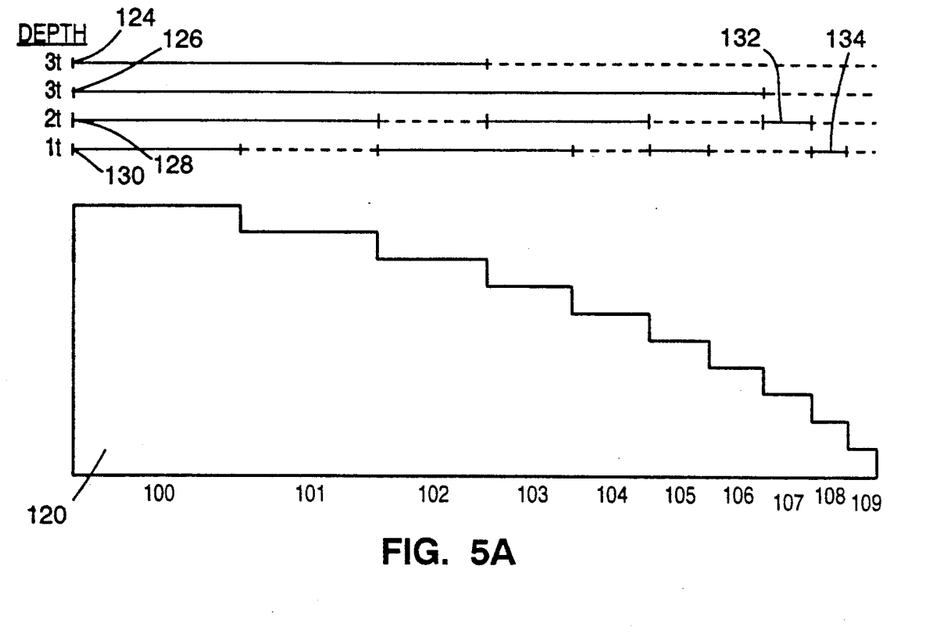
FIG. 5A is a schematic illustration of the masks of FIGS. 4A–4D and of the final result of etching a single wide phase zone with the four masks corresponding to the second sequence of FIG. 3A.
Figure 5B:
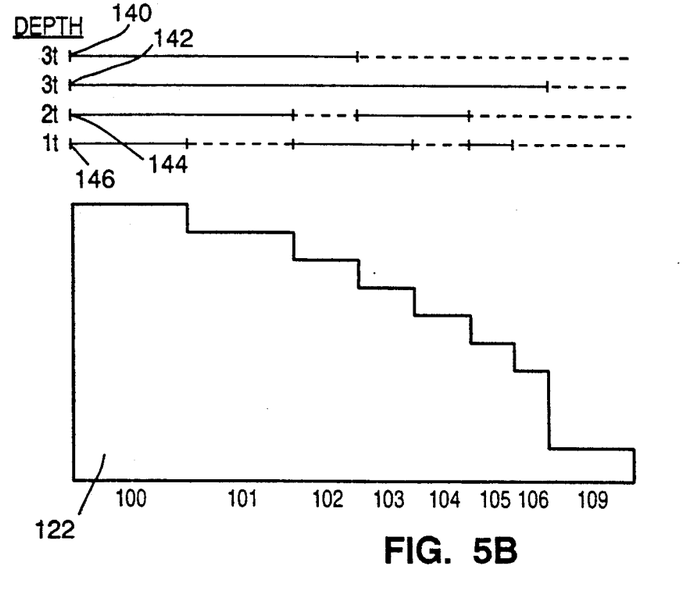
FIG. 5B is a schematic illustrations of masks for etching a single narrow phase zone with four masked out masks related to the second sequence of FIG. 3A.

Reference is now made to FIGS. 5A and 5B which show sections of masks and an etched phase zone produced by the sections of masks for respectively a wide phase zone, labelled 120, and a narrow zone, labelled 122. The 10 steps to be etched are numbered 100-109.

The sections of masks for producing the wide phase zone 120, labelled 124, 126, 128 and 130, are used for etching, respectively, at depths 3t, 3t, 2t and it in accordance with the procedure described hereinabove with respect to FIGS. 4A-4D. For each mask section, the dark lines indicate portions which are to be unetched and the dotted lines indicate portions which are to be etched. The result is a phase zone 120 with steps of differing width and equal height.

It will be noted that the steps reduce in width as they increase in depth (i.e.step 109 is much narrower than step 100). For narrow phase zones, similar to phase zone 122, the step widths can be fairly small. In fact, some of the steps might be smaller than a minimum etching width of the etching process or than a minimum mask width of the mask production process. This problem is overcome by first calculating the maximum number of steps per phase zone in accordance with the present invention and by masking out those steps of a narrow phase zone 122 which are too narrow to etch, in accordance with Applicant's copending U.S. application, Ser. No. 07/479,474, incorporated herein by reference.

The mask sections for producing the narrow phase zone 122 are shown in FIG. 5B and are labelled 140, 142, 144 and 146. In accordance with the present invention, they are designed by taking mask sections 124, 126, 128 and 130 and converting any portions of them which are narrower than the minimum etching width or the minimum mask writing width to the no etch or etch value of its neighbors. In the example shown in FIG. 5B, portions 132 and 134 are converted from being unetched to being etched. The resultant phase zone 122 has eight steps.

It will be recognized that for some very narrow phase zones the entire phase zone can be masked out.

Reference is now made back to FIG. 2. In step 80, the masks are created via printing a photoplot of them and then photoreducing them to the desired size of the optical element 11. Alternatively, the masks can be directly generated with an electron beam generator.

In step 82 the optical element 11 is successively etched or deposited with the sequence of masks defined. The depth to be etched or deposited in conjunction with each mask is as defined in the mask definition hereinabove. As is known in VLSI manufacturing, the surface of the optical element 11 is first coated with a layer of photoresist and a first mask is placed on the photoresist. The optical element 11 is then illuminated by ultraviolet light, after which the photoresist is developed. The pattern of the first mask is thus placed onto the surface of the optical element 11.

The optical element 11 is etched or deposited using any appropriate lithographic process. Suitable etching processes include chemical or plasma or reactive plasma etching whereby each process has its own minimum manufacturing resolution. Suitable deposition processes include evaporation and sputtering.

Once the etching or deposition has finished, the remaining photoresist is removed, typically via chemical processes. A second mask is then aligned on optical element 11 with a mask aligner. The above operations are repeated until the optical element 11 is etched or deposited with the patterns of the entirety of N masks.

It will further be appreciated by persons skilled in the art that the present invention is not limited to what has been particularly shown and described hereinabove. Rather the scope of the present invention is defined only by the claims which follow:

We claim:

1. A diffractive optical element comprising:
   a base; and
   at least one phase zone comprising an arbitrary multiplicity M of steps of identical step height wherein said multiplicity is not a power of 2 and wherein said steps are generated using a number of binary masks with said number of masks being equal to the smallest integer greater than $\log_2 M$.

2. A diffractive optical element according to claim 1 wherein said at least one phase zone has a predetermined zone height and wherein said generally identical step height t is equal to said zone height divided by said multiplicity of steps.

3. A diffractive optical element according to claim 1 wherein said at least one phase zone comprises at least one wide phase zone and at least one narrow phase zone and wherein said arbitrary multiplicity of steps is a different multiplicity of steps for said at least one wide phase zone and for said at least one narrow phase zone.

4. A method of producing a diffractive optical element with at least one phase zone having a zone height and comprising an arbitrary multiplicity M of steps, wherein M is not a power of 2, comprising the stages of:
   defining a basic depth unit t equivalent to said zone height divided by M;
   defining a depth sequence of N depths wherein N is the smallest integer greater than $\log_2 M$ such that each of said M steps can be produced by at least one linear combination of said N depths;
   defining N binary masks wherein each mask enables said optical element to be processed to one of said N depths and wherein for each mask, the steps to be processed are those which have said one of said N depths in its linear combination; and
   serially utilizing each of said N masks for processing of said optical element to create said arbitrary multiplicity of steps wherein each step has a identical step height equivalent to said basic depth unit.

5. A method according to claim 4 and wherein said stage of serially utilizing includes the stage of serially etching said optical element to each of said N depths.

6. A method according to claim 4 and wherein said stage of serially utilizing includes the stage of serially depositing onto said optical element amounts of material whose heights are equivalent to each of said N depths.

7. A method according to claim 4 and wherein said stage of defining a depth sequence includes the stage of defining a new depth sequence from an old depth sequence.

8. A method according to claim 7 and wherein said new depth sequence comprises one more depth than said old depth sequence.

9. A method according to claim 7 and wherein part of said old depth sequence is the depth sequence of powers of 2t up to $2^{N-2}t$.

10. In a method of producing a diffractive optical element with at least one phase zone having a zone height and comprising an arbitrary multiplicity M of steps of identical step height t, wherein M is not a power of 2, the stages of:
defining a basic depth unit t equivalent to said zone height divided by M; and
defining a depth sequence of N depths and wherein N is the smallest integer greater than $\log_2 M$ such that each of said M steps can be produced by at least one linear combination of said N depths.

11. A method of producing a diffractive optical element with at least one phase zone having a zone height and comprising an arbitrary multiplicity M of steps, wherein M is not a power of 2, comprising the stages of:
defining a basic depth unit t equivalent to said zone height divided by M;
defining a depth sequence of N depths wherein N is the smallest integer greater than $\log_2 M$ such that each of said M steps can be produced by at least one linear combination of said N depths;
defining N binary masks wherein each mask enables said optical element to be processed to one of said N depths and wherein for each mask, the steps to be processed are those which have said one of said N depths in its linear combination;
generating said N masks;
coating said diffractive optical element with a layer of photoresist;
placing one mask of said N masks on said layer of photoresist;
exposing said photoresist through said one mask thereby producing the mask pattern on the photoresist;
etching said optical element;
coating said diffractive optical element with a layer of phtoresist;
aligning another mask of said N masks on said layer of photoresist; and
repeating said steps of exposing, etching, aligning and coating until the entirety of said N masks have been utilized and said multiplicity of steps are created each having a identical step height equivalent to said basic depth unit.

12. A method of producing a diffractive optical element with at least one wide and one narrow phase zone each having a zone height, wherein said at least one wide phase zone comprises an arbitrary multiplicity M of steps and wherein M is not a power of 2, comprising the stages of:
defining a basic depth unit t equivalent to said zone height divided by M;
defining a depth sequence of N depths wherein N is the smallest integer greater than $\log_2 M$ such that each of said M steps can be produced by at least one linear combination of said N depths;
defining N binary masks wherein each mask enables said optical element to be processed to one of said N depths, wherein for each mask, the steps to be processed are those which have said one of said N depths in its linear combination and wherein portions of each mask corresponding to portions of said at least one narrow phase zone can be masked out so that the number of steps in said narrow phase zone will be less than M while the wide phase zone will have M number of steps each of identical height equivalent to said basic depth unit; and
serially utilizing each of said N masks for processing of said optical element.

13. A method according to claim 12 and wherein said stage of serially utilizing includes the stage of serially etching said optical element to each of said N depths.

14. A method according to claim 12 and wherein said stage of serially utilizing includes the stage of serially depositing onto said optical element amounts of material whose heights are equivalent to each of said N depths.

* * * * *